Sept. 8, 1959   C. H. SPARKLIN   2,903,535
SPEED GOVERNOR
Filed March 28, 1957   3 Sheets-Sheet 2
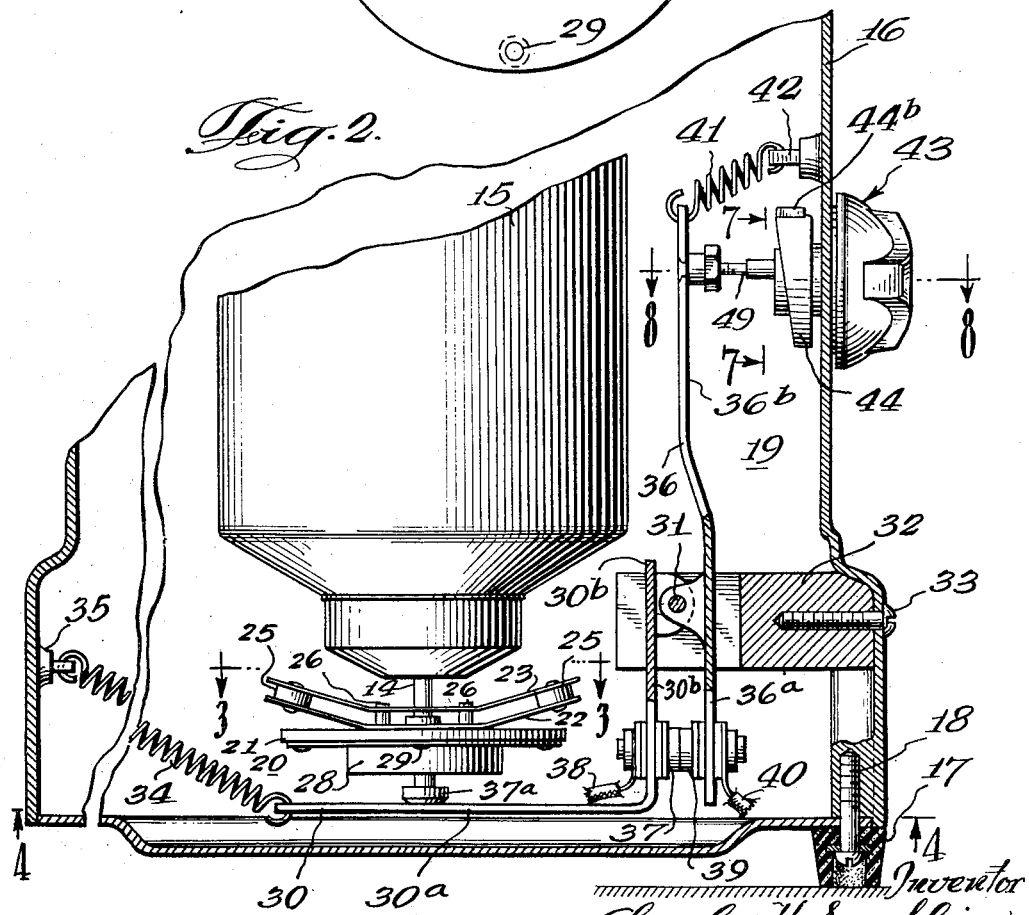
Inventor
Charles H. Sparklin
By Schroeder, Hofgren, Brady & Wegner
Attorneys

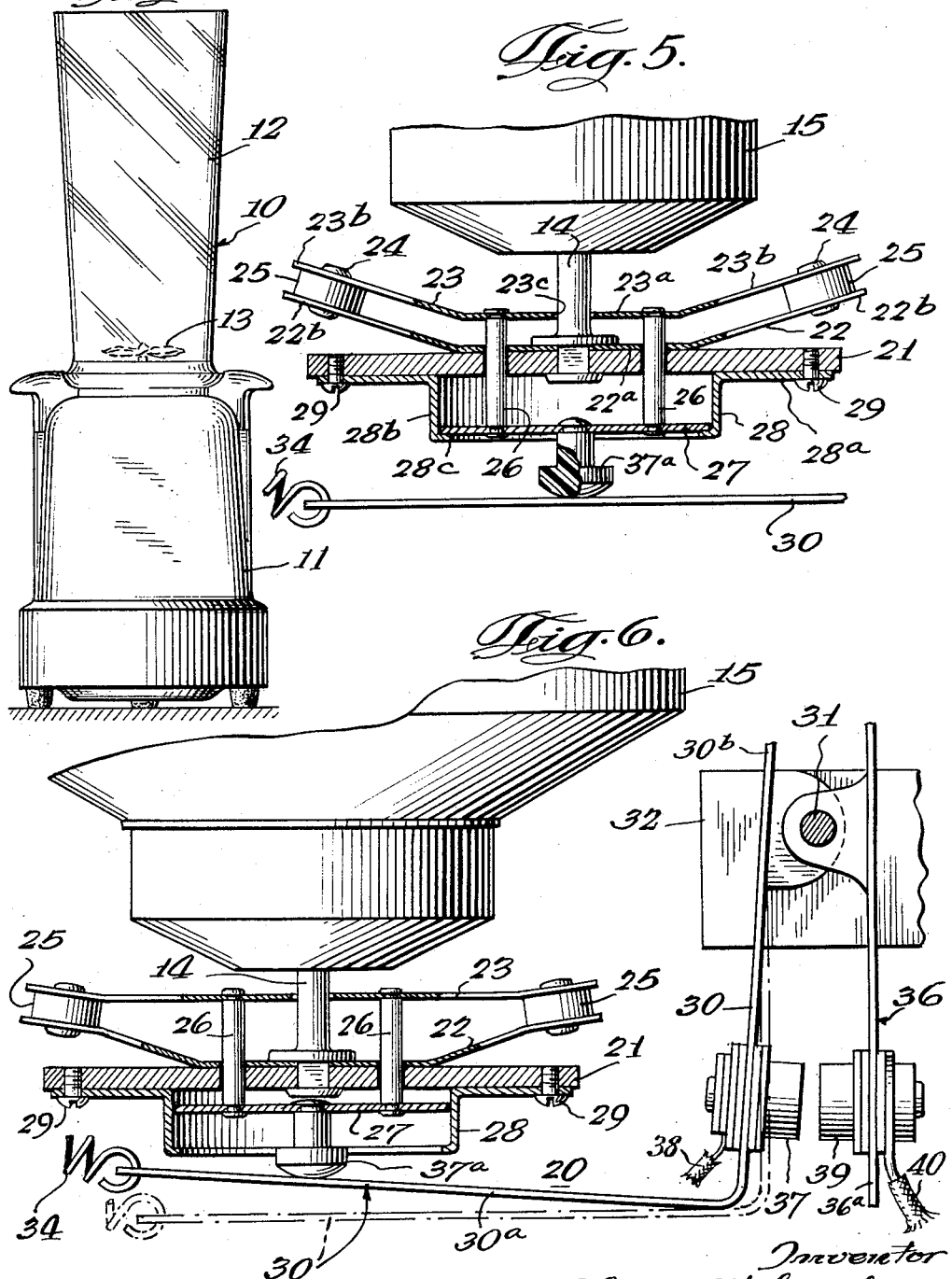

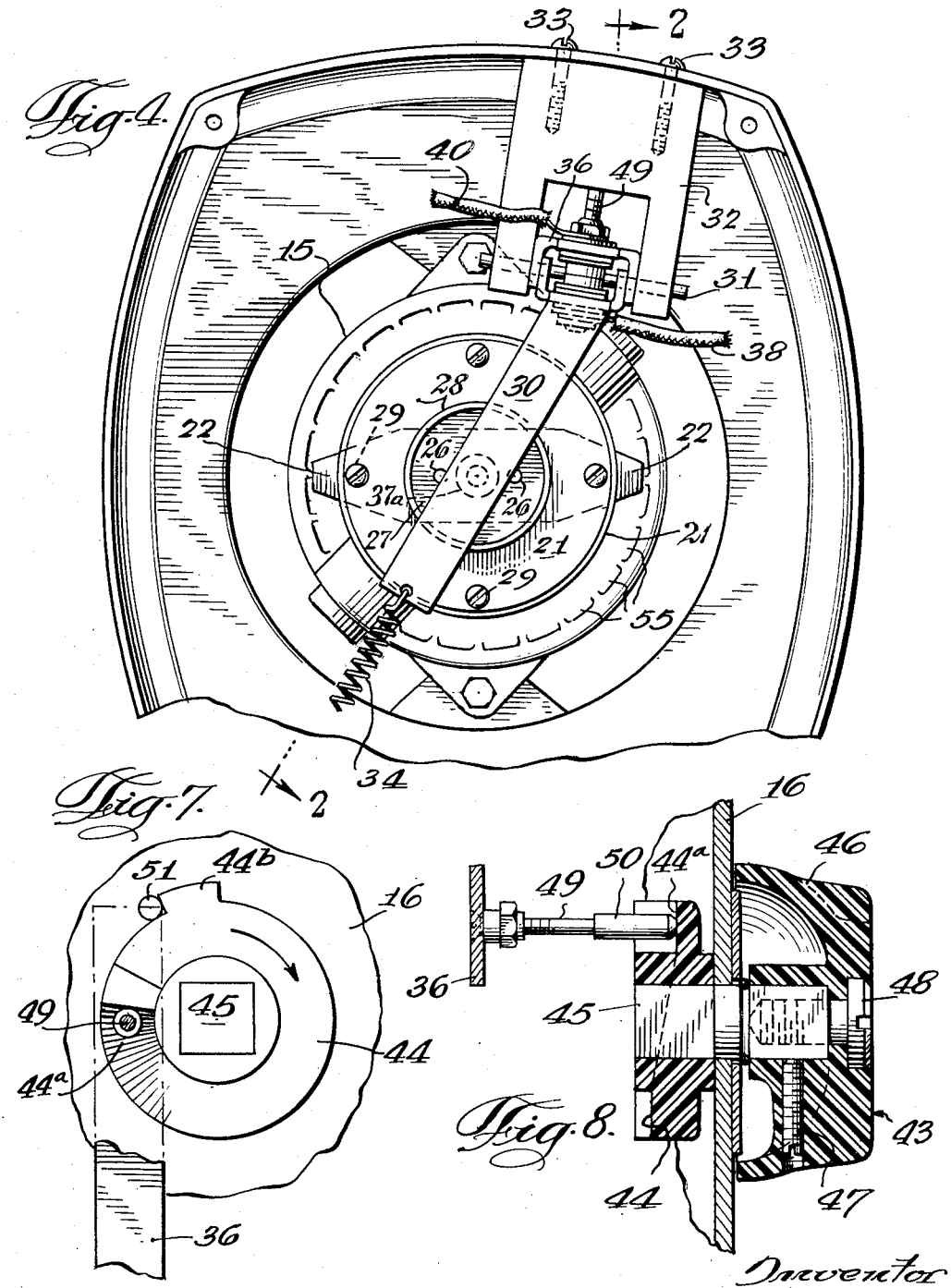

United States Patent Office 2,903,535
Patented Sept. 8, 1959

2,903,535

SPEED GOVERNOR

Charles H. Sparklin, Chicago, Ill., assignor, by mesne assignments, to Whirlpool Corporation, a corporation of Delaware Application March 28, 1957, Serial No. 646,642

13 Claims. (Cl. 200—80)

This invention relates to a speed governor for an electric motor.

Speed governors for motors where the available space surrounding the motor is small are widely used particularly in household appliances and other installations where a variable speed is desired. These have ordinarily been speed controllers of the resistor type wherein only a small number of fixed speeds are available by using a multiple contact switch tapped into the motor at a relatively small number of points. The need for a continuously variable governor in which the speed can be set at any desired point of relatively wide continuous range has long been present. However, because of the space requirements, no such governor of a simple construction and efficient operation has been completely successful.

The present invention successfully solves this problem as it provides a compact, continuously variable speed governor using a very small number of parts and that is ideally adapted for small and confined spaces. The invention will be described as related to the embodiment shown in the accompanying drawings. Of the drawings:

Fig. 1 is a side elevational view of a household mixer or blender of a type to which the present invention is particularly useful because of the confined space within the base of the blender.

Fig. 2 is a fragmentary sectional elevational view through the base of the blender of Fig. 1 taken substantially along line 2—2 of Fig. 4.

Fig. 3 is a sectional view taken substantially along line 3—3 of Fig. 2.

Fig. 4 is a sectional view taken substantially along line 4—4 of Fig. 2.

Fig. 5 is an enlarged sectional view through the bottom portion of the motor controller showing the position of the controller parts when the motor is at rest.

Fig. 6 is a view similar to Fig. 5 but showing the position of the motor controller parts substantially at the time of maximum speed.

Fig. 7 is a sectional view taken substantially along line 7—7 of Fig. 2.

Fig. 8 is a sectional view taken substantially along line 8—8 of Fig. 2.

In the embodiment shown in the accompanying drawings, the invention is illustrated in conjunction with a household food mixer 10 of the blender type. This blender includes a base 11 supporting a movable glass food container 12 in the customary manner. The bottom of the container 12 is provided with a rotatable cutter or disintegrator 13 made up of a plurality of blades. This cutter 13 is adapted to be engaged by the shaft 14 of a vertical motor 15 located in the base 11. This arrangement of blender, base, container, cutter, motor and motor shaft in a device of this type is purely conventional and well-known.

The base 11 includes a casing 16 supported on spaced resilient feet 17 each held in place by means of a bolt 18. The casing 16 is spaced from the motor 15 to provide a relatively narrow side space 19 around the sides of the motor and a bottom space 20 at the bottom of the motor.

The speed governor includes a centrifugally operated portion located within the bottom space 20. This centrifugally operated portion includes a mounting member or plate 21 mounted on the lower end of the motor shaft 14 at substantially right angles thereto. Attached to this plate 21 on the side thereof, adjacent to the motor 15 is a curved elongated springy member in the form of a first leaf spring 22 having its middle portion 22a in contact with one surface of the plate 21 and two opposite end portions 22b bent upwardly to extend away from plate 21 and generally toward the motor 15.

Mounted adjacent to the first leaf spring 22 is a second leaf spring 23 having a shape closely similar to that of the first spring 22. This second leaf spring has a center portion 23a adjacent to the motor shaft 14 and bent end portions 23b normally substantially parallel to the end portions 22b of the first spring 22. The center portion 23a of the second spring is unattached to the shaft 14 but is provided with a hole 23c through which the shaft 14 extends.

The adjacent ends 22b and 23b of the springs 22 and 23 are attached together in spaced relationsip by means of rivets 24. Located between each of these ends is a weighted member 25 which may be made of lead or other heavy material.

Attached to the center portion 23a of the second spring 23 on opposite sides of the shaft 14 are a pair of parallel posts 26 that are also substantially parallel to the motor shaft 14. The ends of these posts 26 that are adjacent to the motor 15 are attached to the center portion 23a as by riveting. The posts then extend through and are slidably retained in the plate member 21 and thus also pass through the center portion 22a of the first spring 22. When the motor is at rest the posts 26 are long enough so that their ends opposite to the motor 15 are located a substantial distance from the plate 21. Attached to these ends of the posts 26 is a transverse disk 27 arranged substantially parallel to the plate 21. In order to guide the movement of the disk 27 during flexing of the springs 22 and 23 there is provided a cup-shaped member 28 mounted on the side of the plate 21 opposite to the motor 15 by a plurality of spaced screws 29. This cup-shaped member has an outwardly extending annular flange 28a which is engaged by the screws 29 and a cylindrical portion 28b against which the edge of the disk 27 slides during movement thereof. The end of the cylindrical portion 28b opposite to the flange 28a is provided with a small inwardly directed flange 28c which serves as a stop for the disk 27.

With this arrangement, as the motor shaft 14 is rotated by the motor, centrifugal force acting on the weights 25 causes the ends 22b and 23b of the springs 22 and 23 to bend toward planar positions in a manner shown in Fig. 6. Because the ends of the springs 22 and 23 are fastened together, this causes the center portion 23c of the second spring 23 to move toward the motor 15 with increasing speed until at maximum speed the spring 23 substantially reaches the position shown in Fig. 6. This movement of the center portion 23a of the spring causes the disk 27 to be drawn by means of the pair of posts 26 toward the plate 21 with increasing speeds.

In order that this movement may govern the speed of the motor there is provided a lever system located in the side and bottom spaces 19 and 20. This lever system is arranged to be adjustable and to separate electrical contacts in the electrical circuit of the motor to interrupt the circuit at a predetermined speed and thereby govern the speed of the motor. In order to conserve space this lever system is arranged at an angle with one leg of the angle adjacent to one end of the motor and the one leg of the angle adjacent to a side of the motor.

In the embodiments shown, the lever system includes a first elongated lever 30 having a first portion 30a in the space 20 and adjacent to the lower end of the motor and an angularly arranged second portion 30b extending toward a side of the motor. The first lever 30 is arranged for rotation about a fulcrum pin 31 located adjacent to an end of the second lever portion 36. This fulcrum pin is held in a bifurcated mounting bracket 32 held on the inner surface of the casing 16 by means of a plurality of bolts 33. The first elongated lever 30 is urged toward the motor 15 by means of a helical spring 34 attached to the end of the lever 30 opposite to the portion 30b and attached to a small bracket 35 on the inner surface of the casing 16. This spring holds the first lever 30 against a button 37a which may be a molded nylon or similar material that is attached at about the center of the disk 27 and substantially aligned with the motor shaft 14.

The lever system also includes a second lever 36 at the side of the motor 15 in the space 19. This second lever has a first portion 36a adjacent to the second portion 30b of the first lever 30 and substantially parallel thereto and a second portion 36b. The two portions 36a and 36b are on opposite sides of the fulcrum pin 31 which also rotatably supports the lever 36. The two portions 36a and 36b are approximately aligned with the upper end of the portion 36b displaced inwardly a small distance toward the motor 15.

The second portion 30b of the first lever 30 carries an electrical contact 37 insulated from the lever and connected in the motor circuit in the customary manner as by an electric lead 38. The first portion 36a of the second lever 36 carries a similar electrical contact 39 similarly insulated from its lever and similarly connected into the motor circuit as by a lead 40. The two contacts 37 and 39 are adapted to engage each other. The end of the second lever 36 opposite to the contact 39 has connected thereto a helical spring 41 whose other end is attached to the casing 16 as by means of a small bracket 42. This spring 41 urges rotation of the lever 36 in a clockwise direction as viewed in Fig. 2 to urge the contacts 37 and 39 into engagement.

In order to adjust the position of the levers 30 and 36 relative to the plate 21 and thereby determine the speed setting, there is provided a speed setting device 43. This device includes a rotatable cam member 44 rotatably mounted on the inner surface of the casing 16 by means of a shaft 45 that extends through the casing. The cam member 44 is provided with a cam surface 44a on the inside thereof arcuately arranged around the axis of rotation of member 44. The outer end of the shaft 45 is provided with a knob 46 held thereon by means of a set screw 47 and an outer axial screw 48. This knob is adapted to be engaged by the fingers of the operator and rotated to a desired position which will be equivalent to the desired speed of the motor.

In order to cause a movement of the lever system about the fulcrum pin 31 by this rotation of the cam 44 there is provided a linkage post 49 attached to the end of the second lever 36 adjacent to the spring 41. This post 49 has an inner end member 50 that is held in engagement with the cam surface 44a by the spring 41. With this arrangement rotation of the cam 44 by means of the knob 46 causes movement of the lever 36 about its fulcrum 31. The cam 44 is provided with a lateral extension 44b adapted to engage a pin 51 and operate as a stop.

With the structure as described, the speed of operation of the motor depends upon the relative position of the lever system. As the cam is rotated to move the lever 36 to the right or to the left as illustrated in Figs. 2, 5 and 6, the speed setting of the motor is changed. Thus when the upper end of the lever 36 is rotated to the left about the fulcrum 31 the speed setting is decreased; as the lever is rotated in the opposite direction the speed setting is increased.

When the motor is rotated centrifugal force on the weights 25 causes the leaf spring end portions 22b and 23b to assume a flat position. This causes the center portion 23a of the second spring 23 to move toward the motor in the manner illustrated in Fig. 6. This movement causes the movement of the disk 27 toward the plate 21. As the first spring 34 holds the lever 30 against the button 37a this lever 30 moves with the button and disk 27 to separate the contacts 37 and 39 and interrupt the current to the motor. Then as the motor speed drops, the springs 22 and 23 tend to resume their unstressed position thereby moving the disk 27 and button 37a away from the plate 21 and again closing the contacts.

As can be seen from the description of the embodiment of the invention the entire speed governor mechanism is relatively thin to fit into a confined space. Furthermore, only a small number of parts are necessary. Because the governor mechanism includes flat levers, these levers can be bent and curved as desired to fit the space available. In the embodiments shown, the lever system is bent to occupy the end and sides of the space. Obviously, if the space available was in some other shape they could be given a configuration necessary to fit this space. Furthermore, the pair of electrical contacts can be located as desired and the fulcrum can be located as desired. In the present embodiment, both the contacts and the fulcrum are located adjacent to the angle wherein the side space 19 and end space 20 join as the maximum available space is located here. As can be seen therefore, an important advantage of this speed governor system is its ready adaptability to the space that is available and to the shape of this available space. In addition, another very important feature of the invention is the simplicity of the centrifugally responsive operating portion of the governor. Fundamentally, it includes only a centrifugally responsive member and a linkage to transfer movement of the responsive member through the lever system to the electrical contacts.

In the embodiments shown in Fig. 4 the rotatable plate 21 is provided at its edges with a plurality of inclined fan blades 55 of the usual type for setting up a current of air for ventilation purposes.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. A speed governor for a motor located in a confined space, comprising: a lever system arranged at an angle with one leg of the angle adjacent to one end of the motor and the other leg of the angle adjacent to a side of the motor, the lever system including a first lever having a first portion adjacent to an end of the motor and an angularly arranged second portion adjacent to the side of the motor substantially at the juncture of said end and said side and a second lever at said side having a first portion adjacent to said second portion of the first lever and a second portion extending therefrom alongside the motor; a pair of cooperating contacts each on one of said levers; centrifugally movable means rotatable by the motor; and means operatively connecting the centrifugally movable means and said first lever first portion for movement of the first lever to separate the contacts when the motor reaches a predetermined speed.

2. The speed governor of claim 1 wherein one of said contacts is on said first lever second portion and the other of said contacts is on said second lever first portion.

3. The speed governor of claim 2 wherein said levers are mounted for movement about a common fulcrum to position said first lever first portion a desired distance from said centrifugally movable means to regulate the speed of the motor.

4. A speed governor for a motor located in a confined space, comprising: a lever system arranged at an angle with one leg of the angle adjacent to one end of the motor and the other leg of the angle adjacent to a side of the motor, the lever system including a first lever having a first portion adjacent to an end of the motor and an angularly arranged second portion adjacent to the side of the motor substantially at the juncture of said end and said side and a second lever at said side having a first portion adjacent to said second portion of the first lever and a second portion extending therefrom alongside the motor; an electrical contact on said first lever second portion; a cooperating electrical contact on said second lever first portion; a fulcrum located substantially at the end of said first lever that is adjacent to the side of the motor about which said levers are movable, the fulcrum being located between said first and second portions of the second lever; centrifugally movable means located at said end of the motor rotatably associated with the motor shaft; means operatively connecting the centrifugally movable means and said first lever first portion for movement of the first lever to separate the contacts when the motor reaches a predetermined speed; and spring means urging said second portion of the first lever and said first portion of the second lever toward each other to urge the contacts into engagement and urging said first portion of the first lever toward said centrifugally movable means.

5. The speed governor of claim 4 wherein said spring means includes a first spring on said first lever urging the first lever about said fulcrum toward said motor end and a second spring on said second lever urging the second lever about said fulcrum toward the first lever.

6. A speed governor for a motor having a rotatable shaft, comprising: a plate member attached to said shaft substantially at right angles thereto; a curved elongated springy member attached to said shaft adjacent to said plate at about the midpoint of said springy member with its ends extending generally toward said motor; a second curved elongated springy member substantially internested with the first member spaced therefrom toward the motor and unattached to the shaft; means fastening each end of one springy member to the correspondnig end of the other member, the curved members tending to bend toward a planar position due to centrifugal force during rotation of the members whereby the unattached springy member is movable relative to the shaft and to the other springy member; a linkage member attached to the second springy member at the movable portion thereof extending through the plate member and slidable therein; and means operatively attaching the linkage member to a separable switch in the electrical circuit to the motor to separate the switch and interrupt the motor current at a predetermined speed.

7. The speed governor of claim 6 wherein a pair of said linkage members are provided located on opposite sides of the motor shaft.

8. A speed governor for a motor having a rotatable shaft, comprising: a plate member attached to said shaft substantially at right angles thereto; a curved elongated springy member attached to said shaft adjacent to said plate at about the midpoint of said member with its ends extending generally toward said motor; a second curved elongated springy member substantially internested with the first member spaced therefrom toward the motor and unattached to the shaft; means fastening each end of one springy member to the corresponding end of the other member, the curved members tending to bend toward a planar position due to centrifugal force during rotation of the members whereby the unattached springy member is movable relative to the shaft and to the other springy member; a pair of posts on opposite sides of the motor shaft attached to the second springy member adjacent to the shaft and substantially parallel thereto, the posts extending away from the motor through said plate member and slidable therein; guide means on the side of said plate member opposite to said motor surrounding said posts; a guide member attached to said posts and movably engaging the guide means to be guided thereby; and means operatively attaching the guide member to a separable switch in the electrical circuit to the motor to separate the switch and interrupt the motor current at a predetermined speed.

9. The speed governor of claim 8 wherein said guide means is of generally cup shape open at the end opposite to the plate member and the guide member includes a transverse disk extending across the guide means having its edge in sliding contact therewith.

10. A speed governor for a motor having a rotatable shaft, comprising: a transverse support attached to said shaft; a curved elongated springy member attached to said shaft at a point intermediate the ends of said springy member, with the springy member generally transverse to said shaft; a second curved elongated springy member substantially internested with the first member spaced therefrom and unattached to the shaft; means fastening each end of one springy member to the corresponding end of the other member, the curved members tending to bend toward a planar position due to centrifugal force during rotation of the members whereby the unattached springy member is movable relative to the shaft and to the other springy member; a linkage member attached to the second springy member at the movable portion thereof extending through the transverse support and slidable therein; and means operatively attaching the linkage member to a separable switch in the electrical circuit to the motor to separate the switch and interrupt the motor current at a predetermined speed.

11. A speed governor for a motor located in a confined space, comprising: a lever system including a pair of closely adjacent, relatively movable, elongated, narrow levers each of which carries an electrical contact adapted to bear against the other, one of the levers being arranged at an angle with one leg of the angle adjacent to one end of the motor and the other leg of the angle adjacent to a side of the motor; and centrifugally movable means operated by the motor acting on said leg that is adjacent to the end of the motor for separating the contacts at a predetermined motor speed.

12. The speed governor of claim 11 wherein the portion of said motor at the intersection of said one end of the motor and said side is provided with a recessed part adjacent which is located said pair of contacts.

13. The speed governor of claim 11 wherein the portion of said motor at the intersection of said one end of the motor and said side is provided with a recessed part adjacent which is located said pair of contacts and also a pivot for said lever system.

References Cited in the file of this patent
UNITED STATES PATENTS

| | | |
|---|---|---|
| 2,544,791 | Hunt | Mar. 13, 1951 |
| 2,552,542 | Duerr | May 15, 1951 |
| 2,719,945 | Tull | Oct. 4, 1955 |
| 2,777,912 | Haines | Jan. 15, 1957 |